B. LOUTZKY.
AUTOMATIC REVERSING GEAR FOR MOTORS.
APPLICATION FILED DEC. 17, 1907.
954,867.
Patented Apr. 12, 1910.
2 SHEETS—SHEET 1.
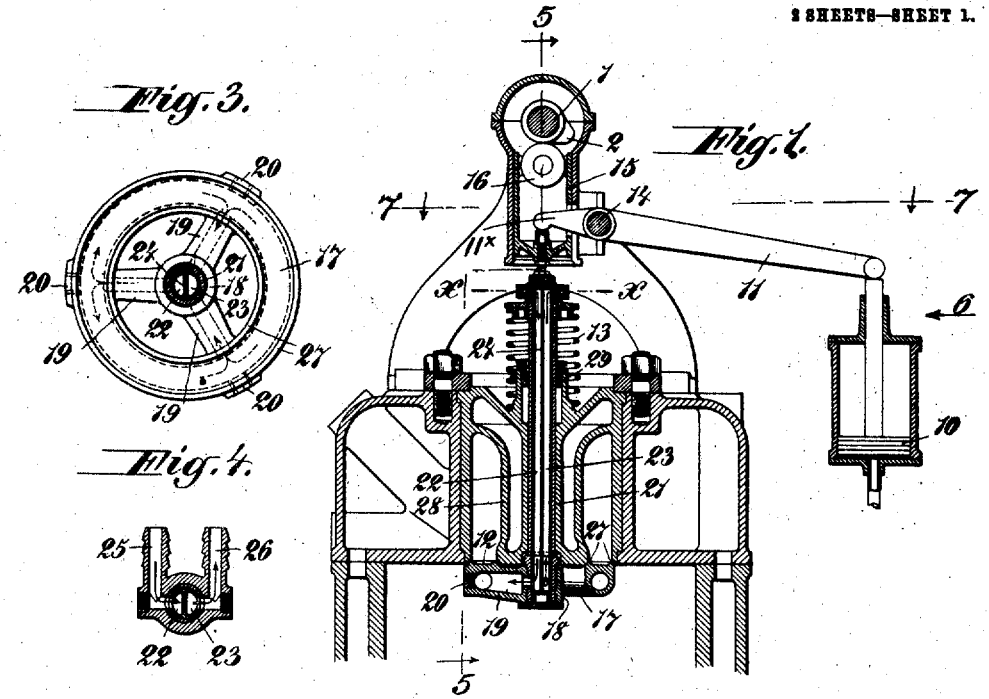
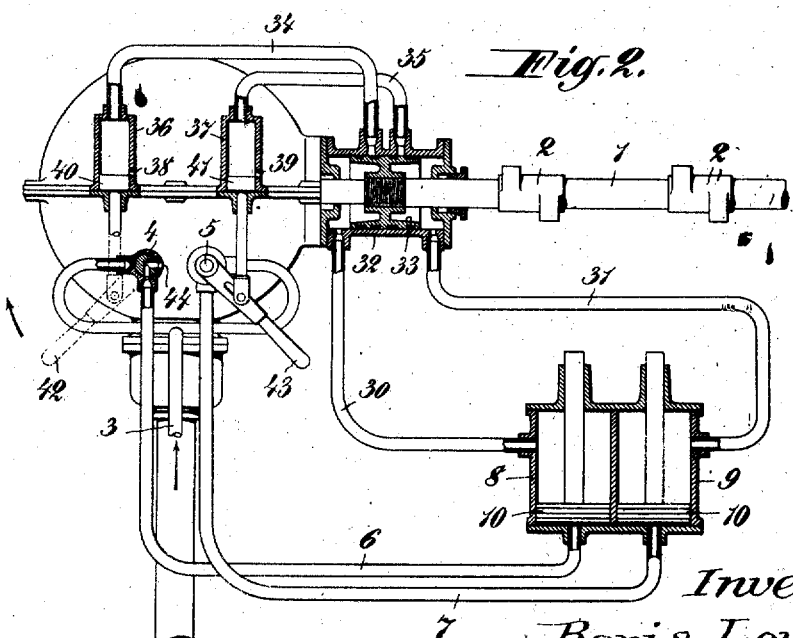
Witnesses,
Chas J Moné
M. G. Crawford
Inventor,
Boris Loutzky
by A. Parker Smith
his Attorney B. LOUTZKY.
AUTOMATIC REVERSING GEAR FOR MOTORS.
APPLICATION FILED DEC. 17, 1907.

954,867.

Patented Apr. 12, 1910
2 SHEETS—SHEET 2

UNITED STATES PATENT OFFICE.

BORIS LOUTZKY, OF BERLIN, GERMANY.

AUTOMATIC REVERSING-GEAR FOR MOTORS.

954,867.  Specification of Letters Patent.  Patented Apr. 12, 1910.

Application filed December 17, 1907. Serial No. 406,838.

*To all whom it may concern:*

Be it known that I, BORIS LOUTZKY, of Berlin, a subject of the Emperor of Russia, and whose post-office address is No. 5 Unterden-Linden, Berlin, Prussia, German Empire, have invented new and useful Improvements in and Relating to Automatic Reversing-Gear for Motors, of which the following is a specification.
This invention relates to motors operated by fluid pressure whether generated by external means or internal combustion, and comprises an idea of means by which all the necessary movements of parts for a reversal of said motors may be automatically produced in proper sequence by the opening of a single cock, the parts placed in position for starting the motor in the reverse direction, and the reversing mechanism returned to normal position ready for succeeding reversals of the motor.

Figure 5:
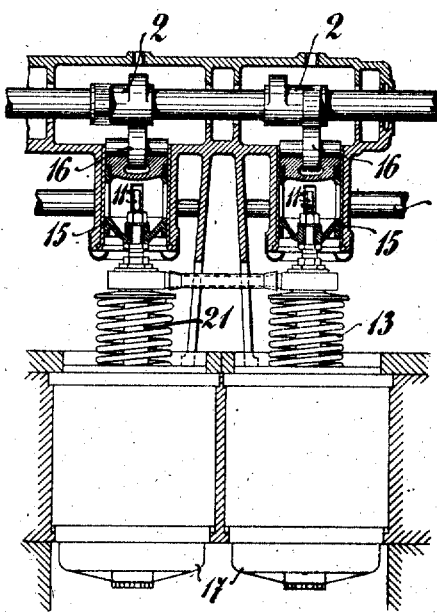
Figure 6:
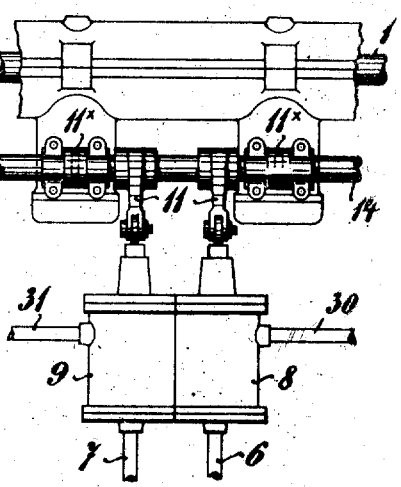
Figure 7:
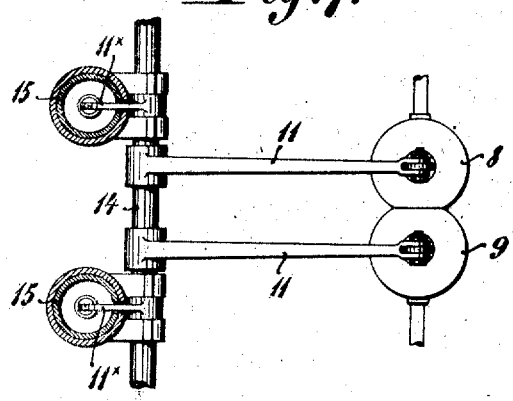

An embodiment of the invention is illustrated in the accompanying drawing, in which:—
Figure 1 is a section through a distributing valve, the distributing shaft and a piston cylinder. Fig. 2 represents a section through the several piston cylinders for the reversing pressure medium. Fig. 3 represents a plan view of the valve body, showing the valve spindle in section. Fig. 4 represents a cross-section taken on the line $x$—$x$ of Fig. 1. Fig. 5 represents a section on the line 5—5 of Fig. 1. Fig. 6 an elevation looking in the direction of the arrow 6 of Fig. 1. Fig. 7 a plan view, partly in section, on the line 7—7 of Fig. 1.

The distributing shaft 1 (Fig. 2) is provided with double sets of cams or tappets 2 for forward and reversed running. The reversing pressure medium employed may consist of compressed air contained in a pressure reservoir (not shown) and supplied through a pipe 3. This pipe is formed into two branches and by means of two cocks 4 and 5 may be placed in communication with a pipe 6 or a pipe 7 or cut off from them both. Each of these pipes 6 and 7 leads to a piston cylinder 8 or 9 of which 8 may be for forward running and 9 for reversed running. The piston 10 of each of these cylinders by means of a lever 11 (Fig. 1) is able to depress a valve 12, which is maintained in a raised position under the influence of the spring 13 and operates during normal running of the motor to control admission to, or exhaust from, the power cylinder.

The levers $11^x$ of all distributing valves are fastened on a shaft 14. In consequence, the lifting of one of the two levers 11 rocks the shaft 14 and the levers $11^x$ of all distributing valves of the motor.

In the position shown in Fig. 1 the valve 12 is in its closed position. A sliding-block 15 rests against the shaft 1 by means of a roller 16. The valve 12 consists of a hollow ring 17 connected with a hollow central portion 18 by means of hollow ribs 19. Perforations in the wall of the ring-body are closed by screw plugs 20. Fixed to the central portion 18 is a hollow valve spindle 21. The latter is divided into two separate chambers 22 and 23 by means of a partition 24. At the top of the spindle 21 nipples 25 and 26 of a top-piece are connected with each chamber respectively, and to the said nipples pipes or tubes for the inlet and outlet of cooling water may be fitted. The ring body is provided at 27 with ground joint faces fitting similar faces on the valve-seat 28. The latter is likewise hollow and may be provided with means for the admission of cooling water. The spindle 21 passes through a stuffing box 29. The cooling water passes through the nipple 25 into the chamber 22 of the spindle 21 and thence through one of the ribs 19 into the annular chamber of the valve ring 17 (see Fig. 3), then flows through the two other ribs 19 into the chamber 23 of the spindle 21, leaving the latter through the nipple 26.

Pipes 30 and 31 extend from the piston cylinders 8 and 9 to the two ends of a cylinder 32, the piston 33 of which is fixed to the distributing shaft 1. In its middle position it closes off two pipes 34 and 35 which extend from it to two cylinders 36 and 37, provided with side openings 38 and 39. The pistons 40 and 41 of these cylinders are connected to the levers 42 and 43 which serve for manipulating the cocks 4 and 5. The casing of each cock 4 and 5 is provided with a discharge-opening 44 connecting pipes 6 and 7, with the external atmosphere when the cocks are closed to prevent flow of fluid from pipe 3.

The operation is a follows:—Assuming that the lever 42 is for producing the reversal from forward to backward running; for reversing the lever 42 is raised in the manner indicated by the arrow, thereby adjusting the cock 4, so that it places the pressure medium pipe 3 in communication with the pipe 6. The compressed air moves the piston 10 of the cylinder 8 in the upward direction and by means of its lever 11 rocks the shaft 14 and the levers 11ˣ of all valves and presses the valves, their sliding blocks 15 and rollers 16 downward. When it has passed beyond the admission aperture of the pipe 30, compressed air passes from the cylinder, and the supply pipe, through this pipe 30 behind the piston 33 of the cylinder 32, which, as all the valves 12 are depressed, and their stems are withdrawn from operative relation with the cams 2, is left free to adjust said shaft longitudinally, and bring the left hand cam of each set, 2, (see Fig. 2) into line with the valve stems. At the end of its stroke the piston 33 opens the admission aperture of the pipe 34, thereby allowing the compressed air to enter the cylinder 36 over its raised piston 40 thus depressing this piston and in consequence the lever 42 and cutting off the supply pipe for the pressure medium from 6; at the same time however the pipe 6 is placed in communication through the cock 4 with an air discharge opening 44 in the cock casing, so that the compressed air is able to escape beneath the piston 10 of the cylinder 8, which is now returned by means of the valve spring 13 and the lever 11 into its initial lower position. The engine is now reversed, but at the same time all the distributing parts have returned to their initial position until the order "forward" is given whereupon the driver only needs to raise the lever 43 in the direction indicated by the arrow and release it, when by means of the cock 5, the cylinder 9, the cylinders 32 and 37 the entire operation of reversal to forward running and resetting in the original position again takes place automatically. When the reversing gear is used on internal combustion engines the ignition is simultaneously thrown in and cut out for the purpose of starting the engine. In continuous running the distributing shaft is stopped.

What I claim, and desire to secure by Letters Patent of the United States, is:—

1. In a motor, the combination of a valve operating shaft capable of longitudinal adjustment for purposes of reversing the motor, a series of valves normally in operative relation to certain of the cams on such shaft, and means for simultaneously withdrawing all such valves from such operative relation, said means comprising a series of levers engaging the valve stems, a fluid pressure cylinder and piston therein operatively connected to said levers.

2. In a motor, the combination of a valve operating cam shaft capable of longitudinal adjustment for purposes of reversing the motor, a valve normally in operative relation to certain of the cams on such shaft, mechanism for adjusting said shaft longitudinally, and means, automatically thrown into action by said adjusting mechanism, to withdraw said valve from operative relation with the cams during the period of movement of the shaft adjusting means, said mechanism comprising a fluid pressure cylinder and piston therein connected to the shaft and said means comprising a series of levers engaging the valve stems, a fluid pressure cylinder with piston therein operatively connected to said lever and a by-pass connection from said last mentioned cylinder to said first mentioned cylinder.

3. In a motor, a longitudinally adjustable revoluble shaft provided with sets of oppositely arranged cams, valves normally in operative relation with one or the other of each of said sets of cams, a fluid pressure cylinder with piston therein connected to said shaft in the line of its adjusting movement, levers engaging the valve stems in the line of their movement to and from the shaft, a fluid pressure cylinder with piston therein and piston rod engaging each of said levers, fluid pressure pipes connected one to each of said two cylinders, a cock for controlling the flow of fluid in each pipe, and a by-pass connection from one of these cylinders to one end of the shaft adjusting cylinder, and a similar connection from the other of said cylinders to the other end of the shaft adjusting cylinder.

4. In a motor, a longitudinally adjustable revoluble shaft provided with sets of oppositely arranged cams, valves normally in operative relation with one or the other of each of said sets of cams, a fluid pressure cylinder with piston therein connected to said shaft in the line of its adjusting movement, levers engaging the valve stems in the line of their movement to and from the shaft, two fluid pressure cylinders each with piston therein and piston rod engaging one of said levers, fluid pressure pipes connected one to each of said two cylinders, a cock for controlling the flow of fluid in each pipe, and a by-pass connection from one of these cylinders to one end of the shaft adjusting cylinder, and a similar connection from the other of said cylinders to the other end of the shaft adjusting cylinder, together with a second set of two fluid pressure cylinders, pistons therein, one of which is operatively connected to one of said cocks and the other to the other of said cocks, and by-pass connections from one of said last mentioned cylinders to one end of the shaft adjusting cylinder, and from the other of said cylinders to the other end of said shaft adjusting cylinder.

5. In a motor, a longitudinally adjustable revoluble shaft provided with sets of oppositely arranged cams, valves normally in operative relation with one or the other of each of said sets of cams, a fluid pressure cylinder with piston therein connected to said shaft in the line of its adjusting movement, levers engaging the valve stems in the line of their movement to and from the shaft, two fluid pressure cylinders each with piston therein and piston rod engaging one of said levers, fluid pressure pipes connected one to each of said two cylinders, a cock for controlling the flow of fluid in each pipe, and a by-pass connection from one of these cylinders to one end of the shaft adjusting cylinder, and a similar connection from the other of said cylinders to the other end of the shaft adjusting cylinder, together with a second set of two fluid pressure cylinders, pistons therein, one of which is operatively connected to one of said cocks and the other to the other of said cocks, and a by-pass connection from one of said last mentioned cylinders to one end of the shaft adjusting cylinder, and from the other of said cylinders to the other end of said shaft adjusting cylinder, said cocks being provided with discharge ports to the outer air connecting with the first mentioned pair of cylinders when said cocks are closed.

6. The combination of a motor reversing mechanism arranged to be operated by a fluid pressure system, a cock for admitting said fluid pressure, a lever controlling said cock and a cylinder having a piston connected to said lever, said cylinder having a connection from one end to the fluid pressure system and an exhaust port in its side near the other end.

In testimony whereof I have hereunto set my hand in presence of two subscribing witnesses.

BORIS LOUTZKY.

Witnesses:
 WOLDEMAR HAUPT,
 HENRY HASPER.